Figure 1:
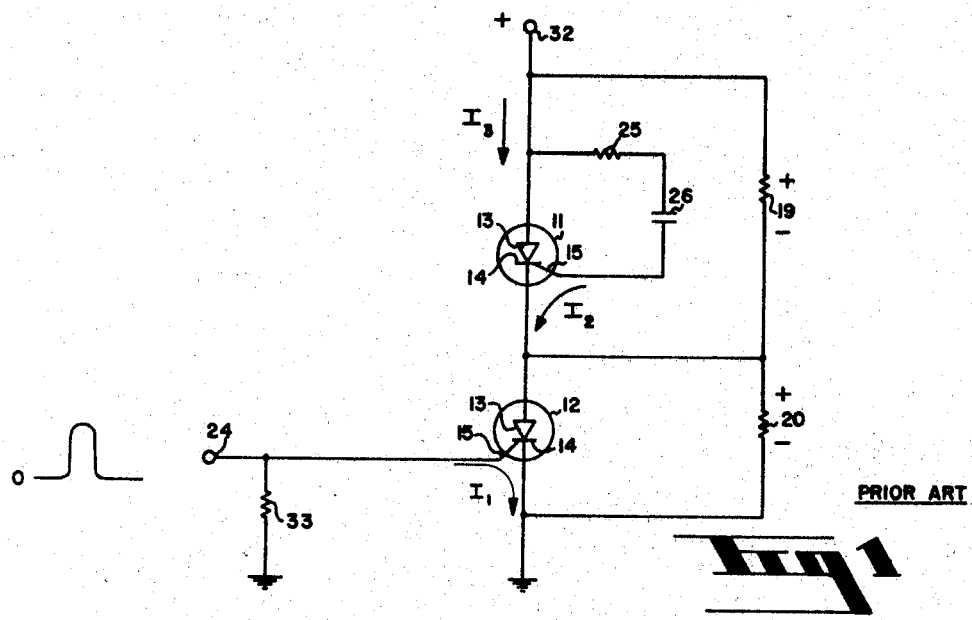

May 31, 1966 J. D. MENG 3,254,236
VOLTAGE SHARING CIRCUIT
Filed Nov. 29, 1963 2 Sheets-Sheet 1

INVENTOR.
JOHN D. MENG
BY
ATTORNEY

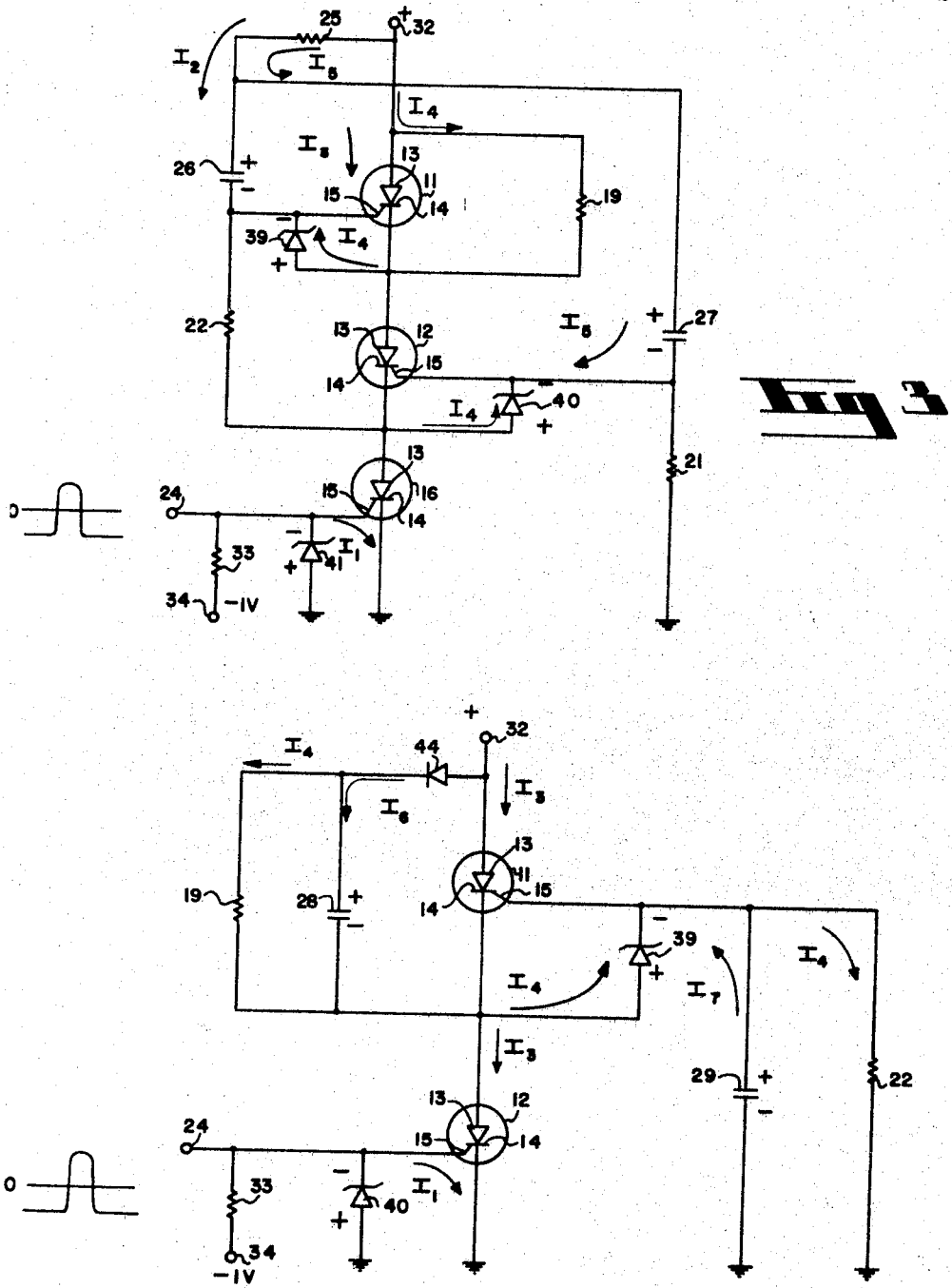

United States Patent Office 3,254,236
Patented May 31, 1966

3,254,236
VOLTAGE SHARING CIRCUIT
John David Meng, Phoenix, Ariz., assignor to General Electric Company, a corporation of New York
Filed Nov. 29, 1963, Ser. No. 326,870
11 Claims. (Cl. 307—88.5)

This invention relates to voltage sharing circuits and more particularly to circuits which provide reverse bias for serially connected silicon controlled rectifiers to prevent a change in voltage across the serially connected rectifiers from firing these rectifiers.

The silicon controlled rectifier is a semiconductor device which can be used as an ON-OFF switch which can be turned on or "fired" by a small gate current in a very few microseconds. Normally the silicon controlled rectifier cannot conduct current between anode and cathode thereof until a pulse of current flows from gate to cathode. If a positive voltage difference exists between the anode and the cathode when the pulse of current flows in the gate, the silicon controlled rectifier "fires" or, is rendered conductive, and a current will flow from the anode to the cathode. Once anode-cathode flow commences, the gate has no further control over such current flow. Current flow from anode to cathode in the rectifier can only be terminated by reducing the anode to cathode current below a "holding" or minimum current value. A more detailed description of the operation of a silicon controlled rectifier can be found in the "Silicon Controlled Rectifier Manual," Second Edition, published by General Electric, Auburn, New York.

Silicon controlled rectifiers are widely used to control current flow as replacements for thyratrons, relays, switches, contactors, and power controllers. The silicon controlled rectifier has a useful life which ordinarily is many times the useful life of these devices which is replaces. It has extremely high reliability; is very compact in size and is free from the effects of vibration and shock.

When the voltage to be applied between anode and cathode of a silicon controlled rectifier is greater than the voltage rating of a single rectifier, two or more rectifiers can be connected in series so that only a portion of the total voltage will develop across each of the rectifiers. Due to the wide variation in the internal resistance of silicon controlled rectifiers, it is necessary in prior art circuits to use resistors connected between anode and cathode of each rectifier so the rectifiers will more equally share the total applied voltage.

In these prior art circuits when it is desired to fire rectifiers connected in series, a signal pulse is applied to the gate of one of the serially connected rectifiers and a "slave firing" circuit is used to fire each of the remaining rectifiers. Such prior art circuits have the disadvantage that an abrupt change in voltage across the serially connected rectifiers may result in an undesired firing of the rectifiers. Such undesired firing can occur due to the cathode of each of the remaining rectifiers being connected by a resistor to a point of lower voltage potential.

It is, therefore, the principle object of the present invention to provide an improved voltage sharing circuit.

Another object of this invention is to provide a voltage sharing circuit for silicon controlled rectifiers which is more stable than prior art circuits.

Another object of this invention is to provide a voltage sharing circuit for silicon controlled rectifiers which is less sensitive to changes in supply voltage than prior art circuits.

Still another object of this invention is to provide a voltage sharing circuit which prevents series-connected silicon controlled rectifiers from firing due to a change in the voltage thereacross.

The foregoing objects are achieved by providing a voltage sharing circuit wherein each of a plurality of serially connected silicon controlled rectifiers has a reverse voltage bias applied between gate and cathode. An input pulse applied to the gate of one of the serially connected rectifiers causes this one rectifier to fire first. The remainder of the rectifiers are each then fired by a separate slave firing circuit which is connected to the gate of each rectifier. A plurality of resistors are connected to the rectifiers in a novel voltage sharing circuit which also provides reverse bias for the gate and cathode of each of the rectifiers so that a change in voltage across the serially connected rectifiers does not cause the rectifiers to fire. In this novel connection the gate of each rectifier is connected by a resistor to a point of lower voltage potential, whereas in the prior art circuit the cathode is connected to the lower voltage potential.

Figure 2:
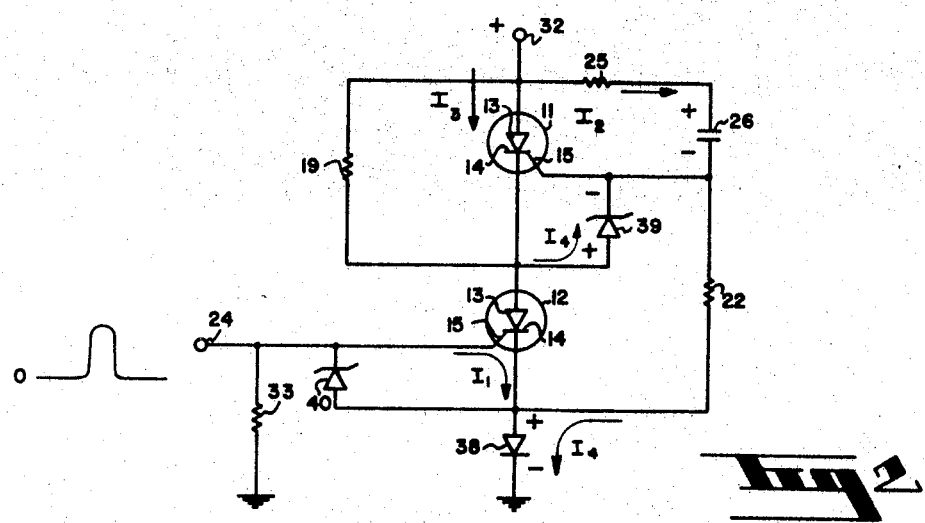

Other objects and advantages of the invention will become apparent from the following detailed description when taken in connection with the accompanying drawings, wherein:

FIG. 1 is a diagram of a prior art circuit;
FIG. 2 is a diagram of one embodiment of the present invention for use with two silicon controlled rectifiers;
FIG. 3 is another embodiment of the present invention for use with three silicon controlled rectifiers; and
FIG. 4 is still another embodiment of the present invention.

FIG. 1 is a circuit which has been used heretofore when it is desired to connect silicon controlled rectifiers in series. A pair of silicon controlled rectifiers 11 and 12 each have an anode 13, a cathode 14 and a gate 15. The cathode 14 of rectifier 11 is connected to anode 13 of rectifier 12 and cathode 14 of rectifier 12 is connected to ground. A pair of resistors 19 and 20 are connected in series to equalize the voltage across rectifiers 11 and 12. Resistor 19 is connected between anode 13 and cathode 14 of rectifier 11. Resistor 20 is connected between anode 13 and cathode 14 of rectifier 12. A signal input terminal 24 is connected to gate 15 of rectifier 12.

A resistor 25 and a capacitor 26 cause rectifier 11 to fire once rectifier 12 has been fired. Resistor 25 has one terminal thereof connected to anode 13 of rectifier 11 and the other terminal connected to one terminal of capacitor 26. The other terminal of capacitor 26 is connected to gate 15 of rectifier 11. An output terminal 32 is connected to anode 13 of rectifier 11. Terminal 32 is usually connected to one terminal of a load, not shown, which may consist of an inductor or a resistor. The other terminal of the load is connected to a positive voltage potential, not shown. Thus, terminal 32 will receive a positive voltage potential through the load. A resistor 33 is connected between gate 15 of rectifier 12 and ground.

Resistor 25 and capacitor 26 comprise a slave firing circuit which fires silicon controlled rectifier 11 when silicon controlled rectifier 12 fires. In a typical example, terminal 32 will have a 500 volt potential, with 250 volts across resistor 19 with neither silicon controlled rectifier in a conductive state. Capacitor 26 will be charged to 250 volts with the polarity shown. When a positive pulse is applied to terminal 24, a current $I_1$ flows from terminal 24 through gate 15 to cathode 14 of rectifier 12 to ground, thereby rendering rectifier 12 conductive. After rectifier 12 fires, the voltage between anode 13 and cathode 14 is approximately 1 volt. Approximately 499 volts exist between terminal 32 and cathode 14 of rectifier 11. With 250 volts across capacitor 26, approximately 249 volts exist across resistor 25 and the internal gate-to-cathode resistance of rectifier 11. A current $I_2$ flows from terminal 32 through resistor 25 to the upper plate of capacitor 26, from the lower plate of capacitor 26, through gate 15 and cathode 14 of rectifier 11, thereby rendering rectifier 11 conductive. Upon the firing of both rectifiers 11 and 12, a heavy output current $I_3$ now flows from terminal 32, through anode 13 to cathode 14 of rectifier 11 to anode 13 and cathode 14 of rectifier 12 to ground.

Two or more silicon controlled rectifiers can be connected in series when the voltage to be applied between anode and cathode is greater than the voltage rating of a single rectifier. Due to the wide variation in internal resistance between anode and cathode in individual rectifiers when these rectifiers are nonconductive, it is necessary to use voltage equalizing or voltage sharing resistors. If resistors 19 and 20 were not used, and if rectifier 11 in FIG. 1 were to have a greater internal resistance than rectifier 12, a large portion of the voltage applied to terminal 32 would be between anode 13 and cathode 14 of rectifier 11, with a much smaller portion between anode 13 and cathode 14 of rectifier 12. This voltage inequality might cause rectifier 11 to breakdown and become a very low resistance. This in turn, would cause nearly all of the voltage of terminal 32 to appear between anode 13 and cathode 14 of rectifier 12 which might also cause it to breakdown.

To prevent this undesired breakdown, resistors 19 and 20 are placed in series between terminal 32 and ground. If resistors 19 and 20 each has the same value of resistance, and if this value of resistance is appreciably less than the internal resistance of either rectifier 11 or rectifier 12, approximately one-half of the voltage applied to terminal 32 will appear across each resistor. Thus, the voltage across rectifier 11 is approximately equal to the voltage across rectifier 12, regardless of the internal resistance of the rectifiers.

FIG. 1 hase the disadvantage that an abrupt change in the voltage at terminal 32 may result in an undesired firing of rectifier 11. Assume that rectifier 11 and rectifier 12 are both nonconducting. If the voltage at terminal 32 increases, current $I_2$ flows from terminal 32 through resistor 25 to the upper plate of capacitor 26, from the lower plate of capacitor 26, through gate 15 and cathode 14 of rectifier 11, and through resistor 20 to ground, thereby causing rectifier 11 to fire.

Due to internal capacitance between anode and gate, an additional current may flow from anode through the anode-to-gate capacitance, from gate to cathode thereby aiding current $I_2$ in causing rectifier 11 to fire. When rectifier 11 fires, the resistance between anode 13 and cathode 14 becomes very low, so nearly all of the voltage at terminal 32 is between anode 13 and cathode 14 of rectifier 12. This excess voltage across rectifier 12 may cause this rectifier to breakdown.

FIG. 2 illustrates an embodiment of the present invention intended to eliminate spurious condition in the prior art circuit of FIG. 1. The differences between the circuit of FIG. 2 and that of FIG. 1 follow these differences embodying the instant invention. One terminal of a resistor 22 is connected to gate 15 of rectifier 11 instead of cathode 14 of rectifier 11 as in FIG. 1. A diode 38 has its anode connected to cathode 14 of rectifier 12 and its cathode connected to ground, or a source of negative voltage, or a reference potential. A Zener diode 39 has its anode connected to cathode 14 of rectifier 11 and its cathode connected to gate 15 of rectifier 11. A Zener diode 40 has its anode connected to cathode 14 of rectifier 12 and its cathode to gate 15 of rectifier 12. Since the other elements are the same as those shown in the circuit of FIG. 1, they have received the same corresponding designating numerals.

The Zener diode has the characteristic of providing a constant voltage drop across its terminals for a wide range of amplitude of currents flowing through the diode in a reverse direction; that is from cathode to anode. Therefore, the voltage difference between gate 15 and cathode 14 of rectifier 11 or rectifier 12 will be constant whenever the voltage applied between gate 15 and cathode 14 of the associated rectifier is positive and exceeds the "Zener" or critical breakdown voltage of the associated Zener diode. Thus, a Zener diode protects each rectifier so the peak gate-cathode voltage rating of the rectifier is not exceeded.

The operation of the circuit of FIG. 2 will now be described. Prior to the time a signal is applied to input terminal 24, rectifier 11 and rectifier 12 each has a high value of internal resistance between anode 13 and cathode 14. A current $I_4$ flows from terminal 32, through resistor 19, Zener diode 39, resistor 22 and diode 38 to ground. Current $I_4$ provides the voltage polarities shown across diode 38 and Zener diode 39. The voltage across Zener diode 39 provides a reverse voltage bias between gate 15 and cathode 14 of rectifier 11 so that changes in voltage at terminal 32 will not fire rectifier 11 in the manner described in connection with the prior art circuit of FIG. 1. The voltage across diode 38 provides a reverse voltage bias between gate 15 and cathode 14 of rectifier 12. If the voltage at terminal 32 increases, the voltage at cathode 14 of rectifier 11 also increases. Current $I_2$ flows from terminal 32 through resistor 25 to the upper plate of capacitor 26, from the lower plate of capacitor 26 through resistor 22 and diode 38 to ground. Due to the high internal resistance between anode 13 and cathode 14 of rectifier 12, no current can flow from gate 15 to cathode 14 of rectifier 11 through rectifier 12 to ground, so rectifier 11 does not fire.

If the voltage at terminal 32 decreases, there is still no current flow from gate 15 to cathode 14 of rectifier 11 due to the high internal resistance between anode 13 and cathode 14 of rectifier 12. Thus, in the present invention a change in voltage across the serially connected silicon controlled rectifiers does not result in an undesired firing of a rectifier as occurred in the prior art circuit.

Rectifiers 11 and 12 can be fired in a manner similar to that described above in connection with FIG. 1. In a typical example, in the unfired condition, terminal 32 would have a 500 volt potential, with 249 volt across resistor 19, 1 volt across Zener diode 39, 249 volts across resistor 22 and 1 volt across diode 38. Capacitor 26 would be charged to 250 volts with the polarity shown. When a positive pulse is applied to terminal 24, current $I_1$ flows from terminal 24 through gate 15 to cathode 14 of rectifier 12 and through diode 38 to ground, thereby rendering rectifier 12 conductive. After rectifier 12 fires, the voltage between anode 13 of rectifier 12 and ground is approximately 2 volts. Capacitor 26 will begin charging toward 500 volts. Current $I_2$ flows from terminal 32 through resistor 25 to the upper plate of capacitor 26, from the lower plate of capacitor 26 through gate 15 to cathode 14 of rectifier 11, through anode 13 to cathode 14 of rectifier 12 and diode 38 to ground, thereby rendering rectifier 11 conductive.

Zener diode 39 protects rectifier 11 so that the peak gate-to-cathode voltage rating of rectifier 11 is not exceeded. Output current $I_3$ now flows from terminal 32 through anode 13 to cathode 14 of rectifiers 11 and 12 and through diode 38 to ground.

Thus, the prior art voltage sharing circuit having a resistor connected between the cathode of the slave fired rectifier and a lower voltage potential has been replaced by a novel voltage sharing circuit having a resistor connected between the gate of the slave fired rectifier and a lower voltage potential. This novel voltage sharing circuit provides a reverse voltage bias between gate and cathode of the slave fired rectifier to prevent spurious firing of the slave fired rectifier.

FIG. 3 illustrates another embodiment of the present invention wherein three silicon controlled rectifiers 11, 12 and 16, each having an anode 13, a cathode 14 and a gate 15 are connected in series so that a larger voltage potential can be applied to terminal 32. In accordance with the principles herein set forth, any desired number of silicon controlled rectifiers can be connected in series so that any desired voltage can be applied to terminal 32. Anode 13 of rectifier 16 is connected to cathode 14 of rectifier 12. Cathode 14 of rectifier 16 is connected to ground. Gate 15 of rectifier 16 is connected to input terminal 24.

A resistor 21 and resistors 19 and 22 equalize the voltage across rectifiers 11, 12 and 16. Resistor 21 is connected between gate 15 of rectifier 12 and ground. Resistor 25 and a capacitor 27 provide slave firing of rectifier 12. Capacitor 27 has one terminal connected to gate 15 of rectifier 12 and the other terminal connected to the junction point between resistor 25 and capacitor 26. A Zener diode 41 has the anode connected to ground and the cathode connected to gate 15 of rectifier 16. Resistor 33 is connected between terminal 24 and a terminal 34, which in turn is connected to a reverse bias potential such as a negative 1 volt. Since the other elements are the same as those shown in the circuit of FIG. 2, they have received the same corresponding designating numerals.

Prior to the time a signal is applied to terminal 24, rectifiers 11, 12 and 16, each has a high value of internal resistance between anode 13 and cathode 14. Current $I_4$ flows from terminal 32 through resistor 19, Zener diode 39, resistor 22, Zener diode 40 and resistor 21 to ground. Current $I_4$ provides the voltage polarities shown across Zener diodes 39 and 40. The voltage across each diode provides a reverse voltage bias between gate 15 and cathode 14 of the associated rectifier to prevent changes in voltage at terminal 32 from firing the rectifiers as was explained in connection with FIG. 2. Reverse bias between gate 15 and cathode 14 of rectifier 16 is provided by the negative 1 volt applied to terminal 34 and coupled to gate 15 by resistor 33. Zener diode 41 clamps the gate voltage of rectifier 16 so the bias voltage between gate and cathode is equal to the forward diode voltage drop of diode 41.

Firing of the serially connected rectifiers of FIG. 3 can be accomplished by applying a positive voltage pulse to terminal 24. This positive pulse fires rectifier 16. Slave firing circuits then fire rectifier 12 and rectifier 11. In a typical example, terminal 32 would have a 600 volt potential, with approximately 200 volts across each of resistors 19, 21 and 22. Capacitor 26 would be charged to 200 volts with the polarity shown and capacitor 27 to 400 volts with the polarity shown. When a positive pulse is applied to terminal 24, current $I_1$ flows from terminal 24 through gate 15 to cathode 14 of rectifier 16 to ground, thereby rendering rectifier 16 conductive. After rectifier 16 fires, the voltage at anode 13 of rectifier 16 will be near ground potential. Capacitor 27 will begin charging toward 600 volts. A current $I_5$ flows from terminal 32 through resistor 25 to the upper plate of capacitor 27, from the lower plate of capacitor 27, through gate 15 to cathode 14 of rectifier 12, through anode 13 to cathode 14 of rectifier 16 to ground, thereby rendering rectifier 12 conductive.

After rectifier 12 fires, the voltage at anode 13 of rectifier 12 will be near ground potential. Capacitor 26 will begin charging toward 600 volts. Current $I_2$ flows from terminal 32 through resistor 25 to the upper plate of capacitor 26, from the lower plate of capacitor 26 through gate 15 to cathode 14 of rectifier 11, through anode 13 to cathode 14 of rectifier 12 and anode 13 to cathode 14 of rectifier 16 to ground, thereby rendering rectifier 11 conductive. Output current $I_3$ now flows terminal 32 through anode 13 to cathode 14 of rectifiers 11, 12 and 16 to ground.

FIG. 4 illustrates another embodiment of the present invention, wherein a pair of capacitors 28 and 29 aid resistors 19 and 22 in equalizing the voltages across the serially connected silicon controlled rectifiers of FIG. 2. Capacitor 28 is connected across resistor 19 and capacitor 29 is connected across resistor 22. Capacitor 29 provides slave firing of rectifier 11 when rectifier 12 fires. A diode 44 is connected between terminal 32 and resistor 19 of FIG. 2 to aid in preventing a decreasing voltage at terminal 32 from firing rectifier 11. The anode of diode 44 is connected to terminal 32 and the cathode is connected to one terminal of resistor 19. Cathode 14 of rectifier 12 is connected to ground. Resistor 33 is connected between terminal 24 and a terminal 34, which in turn is connected to a reverse bias potential such as a negative 1 volt. Since the other elements are the same as those shown in the circuit of FIG. 2, they have received the same corresponding designating numerals.

The operation of FIG. 4 will now be described. Current $I_4$ flows from terminal 32 through diode 44, resistor 19, Zener diode 39 and resistor 22 to ground in nonfired state. Current $I_4$ provides the voltage polarity shown across Zener diode 39 to provide reverse bias between gate 15 and cathode 14 of rectifier 11 in the manner discussed in connection with FIG. 2. Reverse bias between gate 15 and cathode 14 of rectifier 12 is provided by the negative 1 volt applied to terminal 32 and coupled to gate 15 by resistor 33. Zener diode 40 clamps the gate voltage of rectifier 12 so the bias voltage between gate and cathode is equal to the forward diode voltage drop of diode 40.

Capacitors 28 and 29 aid in equalizing the voltage across rectifiers 11 and 12 when an abrupt increase in voltage occurs at terminal 32. In a typical example, the voltage at terminal 32 would be 500 volts, with approximately 250 volts across capacitor 28 and another 250 volts across capacitor 29 with the polarities shown. The voltage at terminal 32 may increase rapidly to 700 volts. If capacitor 28 were not in the circuit, all of the voltage increase would be developed across resistor 19, as capacitor 29 would hold the voltage constant at gate 15 of rectifier 11; i.e., the voltage across resistor 19 would be 450 volts which could cause damage to rectifier 11, as a typical maximum voltage rating between anode 13 and cathode 14 of rectifier 11 is 400 volts. However, with capacitors 28 and 29 both in the circuit, if the voltage at terminal 32 suddenly increases, a current $I_6$ flows from terminal 32 through diode 44 to the upper plate of capacitor 28, from the lower plate of capacitor 28 through Zener diode 39 to the upper plate of capacitor 29, and from the lower plate of capacitor 29 to ground. By proper choice of values of capacitors 28 and 29, approximately 350 volts of the polarity shown will appear across each capacitor, thus preventing damage to rectifiers 11 and 12.

Capacitor 29 provides slave firing of rectifier 11. In the typical example set forth above, terminal 32 has a 500 volt potential and capacitors 28 and 29 are each charged to 250 volts of the polarity shown. When a positive pulse is applied to terminal 24, current $I_1$ flows from terminal 24 through gate 15 to cathode 14 of rectifier 12 to ground, thereby rendering rectifier 12 conductive. After rectifier 12 fires, the voltage at anode 13 of rectifier 12 is near ground potential. A current $I_7$ flows from the upper plate of capacitor 29 through gate 15 to cathode 14 of rectifier 11 through anode 13 to cathode 14 of rectifier 12 to ground, thereby rendering rectifier 11 conductive. Output current $I_3$ then flows from terminal 32 through anode 13 to cathode 14 of rectifier 11, through anode 13 to cathode 14 of rectifier 12 to ground.

Diode 44 prevents an abrupt decrease in voltage at terminal 32 from firing rectifier 11. If diode 44 were not in the circuit, a decrease in voltage at terminal 32 would cause a corresponding decrease in voltage at cathode 14 of rectifier 11 so that gate 15 of rectifier 11 would have a higher voltage than cathode 14 of rectifier 11. A current $I_7$ would flow from the upper plate of capacitor 29 through gate 15 to cathode 14 of rectifier 11 to the lower plate of capacitor 28 and from the upper plate of capacitor 28 to terminal 32 thereby firing rectifier 11. Nearly all of the voltage at terminal 32 would be across rectifier 12, which could cause rectifier 12 to breakdown.

With diode 44 as shown in the circuit, current $I_7$ cannot flow from the upper plate of capacitor 28 to terminal 32, so that such spurious firing of rectifier 11 cannot occur.

Thus the objects set forth herein are realized by the instant invention wherein resistors connected and disposed in a novel arrangement are employed to provide a voltage sharing circuit which also provides reverse bias for each of a plurality of serially connected silicon controlled rectifiers to prevent a change in voltage across these serially connected rectifiers from causing them to fire.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A voltage sharing circuit for use with a positive voltage potential, a reference potential and a plurality of serially connected semiconductor current controlled switches, each of said switches having an anode, a cathode, and a gate, the cathode of each of said switches being connected to the anode of the next of said switches, the cathode of a last of said switches being connected to the reference potential, said circuit; comprising a plurality of resistors, a first of said resistors being connected from the anode of a first of said switches to the cathode of said first of said switches, each of the remainder of said resistors being connected from the gate of one of said switches to the cathode of the next of said serially connected switches, the anode of a first of said switches being coupled to said positive potential, whereby a change in voltage across said serially connected switches is prevented from firing said plurality of switches.

2. A voltage sharing circuit for use with a positive voltage potential, a reference potential and a plurality of serially connected silicon controlled rectifiers, each of said rectifiers having an anode, a cathode, and a gate, the cathode of each of said rectifiers being connected to the anode of the next of said rectifiers, the cathode of a last of said rectifiers being connected to the reference potential, said circuit comprising a plurality of resistors, with a first of the resistors connected from the anode of a first of the rectifiers to the cathode of said first rectifier, each of the remainder of the resistors being connected from the gate of one of the rectifiers to the cathode of the next of the serially connected rectifiers, said anode of the first of said rectifiers being coupled to said positive potential whereby a change in voltage across said serially connected rectifiers is prevented from firing said plurality of rectifiers.

3. A voltage sharing circuit for use with a positive voltage potential and a reference potential, said circuit comprising a first and a second silicon controlled rectifier, each having an anode, a cathode and a gate, said first and second rectifiers being serially connected with said cathode of said first rectifier connected to said anode of said second rectifier, said anode of said first rectifier being coupled to said positive voltage potential, a diode having an anode and a cathode, said anode of said diode being connected to said cathode of said second rectifier and said cathode of said diode being connected to the reference potential, and first, second and third resistors, said first resistor being connected between said anode of said first rectifier and said cathode of said first rectifier, said second resistor being connected between said gate of said first rectifier and said cathode of said second rectifier, said third resistor being connected between said gate of said second rectifier and the reference potential, whereby reverse bias is applied to each of said rectifiers to prevent a change in voltage across said serially connected rectifiers from firing said first and second rectifiers.

4. A voltage sharing circuit for use with a positive voltage potential and a reference potential, said circuit comprising a first and a second silicon controlled rectifier, each having an anode, a cathode and a gate, said first and second rectifiers being serially connected with said cathode of said first rectifier connected to said anode of said second rectifier, said anode of said first rectifier being coupled to said positive potential, a diode having an anode and a cathode, said anode of said diode being connected to said cathode of said second rectifier and said cathode of said diode being connected to the reference potential, a first and a second Zener diode, each having an anode and a cathode, said cathode of said first Zener diode being connected to said gate of said first rectifier and said anode of said first Zener diode being connected to said cathode of said first rectifier, said cathode of said second Zener diode being connected to said gate of said second rectifier and said anode of said second Zener diode being connected to said cathode of said second rectifier, and first, second and third resistors, said first resistor being connected between said anode of said first rectifier and said cathode of said first rectifier, said second resistor being connected between said gate of said first rectifier and said cathode of said second rectifier, said third resistor being connected between said gate of said second rectifier and the reference potential, whereby reverse bias is applied to each of said rectifiers to prevent a change in voltage across said serially connected rectifiers from firing said first and second rectifiers.

5. A voltage sharing circuit for us with a postive voltage potential and a reference potential, said circuit comprising a first and a second silicon controlled rectifier, each having an anode, a cathode and a gate, said first and second rectifiers being serially connected with the cathode of said first rectifier connected to said anode of said second rectifier, said cathode of said second rectifier being connected to the reference potential, said anode of said first rectifier being coupled to said positive potential, a first and a second Zener diode each having an anode and a cathode, said cathode of said first diode being connected to said gate of said first rectifier and said anode of said first diode being connected to said cathode of said first rectifier, said cathode of said second diode being connected to said gate of said second rectifier and said anode of said second diode being connected to said cathode of said second rectifier, a signal input terminal, said terminal being connected to said gate of said second rectifier, first, second and third resistors, said first resistor being connected between said anode of said first rectifier and said cathode of said first rectifier, said second resistor being connected between said gate of said first rectifier and said cathode of said second rectifier, a bias potential, said third resistor being connected between said gate of said second rectifier and said bias potential, whereby reverse bias is applied to each of said rectifiers to prevent a change in voltage across said serially connected rectifiers from firing said first and second rectifiers, a means for firing said second rectifier by applying a signal pulse to said signal input terminal, and a means for slave firing said first rectifier.

6. A voltage sharing circuit for use with a positive voltage potential and a plurality of serially connected silicon controlled rectifiers, each of said rectifiers having an anode, a cathode and a gate, said circuit comprising a plurality of resistors, with a first of the resistors connected from the anode of a first of the rectifiers to the cathode of said first rectifier, each of the other resistors being connected from the gate of a corresponding one of the rectifiers to the cathode of the next serially connected rectifier, said anodes of said first rectifier being coupled to said positive potential, a plurality of Zener diodes each having an anode and a cathode, each of the Zener diodes having the cathode connected to the gate of a corresponding one of the rectifiers and the anode connected to the same rectifier, whereby reverse bias is applied to each of the rectifiers to prevent a change in voltage across said serially connected rectifiers from firing these rectifiers, a signal input terminal, said terminal being connected to the gate of a predetermined one of said rectifiers, a means for applying a signal pulse to the gate of said predetermined rectifier, and a means for slave firing each of the remainder of said serially connected rectifiers.

7. A voltage sharing circuit for use with a positive potential and a reference voltage potential, said circuit comprising a first and a second silicon controlled rectifier, each having an anode, a cathode and a gate, said first and second rectifier being serially connected with said cathode of said first rectifier connected to said anode of said second rectifier, said cathode of said second rectifier being connected to the reference potential, a first and a second Zener diode each having an anode and a cathode, said cathode of said first diode being connected to said gate of said first rectifier and said anode of said first diode connected to said cathode of said first rectifier, said cathode of said second diode connected to said gate of said second rectifier and said anode of said second diode connected to said cathode of said second rectifier, first, second, third and fourth resistors, said first resistor being connected between said anode and said cathode of said first rectifier, said second resistor connected between said gate of said first rectifier and said cathode of said second rectifier, a signal input terminal, said terminal being connected to said gate of said second rectifier, a capacitor, said third resistor and said capacitor being serially connected between said anode and said gate of said first rectifier, and a bias potential, said fourth resistor being connected between said gate of said second rectifier and said bias potential, whereby reverse bias is applied to each of said rectifiers to prevent a change in voltage across said serially connected rectifier from firing said first and second rectifiers.

8. A voltage sharing circuit for use with a positive voltage potential and a reference potential, said circuit comprising a first and a second silicon controlled rectifier, each having an anode, a cathode and a gate, said first and said second rectifiers being serially connected with said cathode of said first rectifier connected to said anode of said second rectifier, said anode of said first rectifier being coupled to said positive potential, a diode having an anode and a cathode, said anode of said diode being connected to said cathode of said second rectifier and said cathode of said diode being connected to the reference potential, a signal input terminal, said terminal being connected to said gate of said second rectifier, first, second, third and fourth resistors, a capacitor, said first resistor being connected between said anode and said cathode of said first rectifier, said second resistor connected between said gate of said first rectifier and cathode of said second rectifier, and a first and a second Zener diode each having an anode and a cathode, said cathode of said first Zener diode being connected to said gate of said first rectifier and said anode of said first Zener diode connected to said cathode of said first rectifier, said cathode of said second Zener diode connected to said gate of said second rectifier and said anode of said second Zener diode connected to said cathode of said second rectifier, said third resistor and said capacitor being serially connected between said anode and said gate of said first rectifier, said fourth resistor being connected between said gate of said second rectifier and the reference potential, whereby reverse bias is applied to each of said rectifiers to prevent a change in voltage across said serially connected rectifiers from firing said first and second rectifiers.

9. A voltage sharing circuit for use with a positive voltage potential and a reference potential, said circuit comprising first, second and third silicon controlled rectifiers, each having an anode, a cathode and a gate, said first second and third rectifiers being serially connected with said cathode of said first rectifier connected to said anode of said second rectifier, said cathode of said second rectifier connected to said anode of said third rectifier and said cathode of said third rectifier connected to the reference potential, said anode of said first rectifier being coupled to said positive potential, a signal input terminal, said terminal being connected to said gate of said third rectifier, first, second, third fourth and fifth resistors, a first and a second capacitor, said first resistor being connected between said anode and said cathode of said first rectifier, said second resistor connected between said gate of said first rectifier and said cathode of said second rectifier, said third resistor connected between said gate of said second rectifier and said cathode of said third rectifier, said fourth resistor and said first capacitor being serially connected with said fourth resistor connected to said anode of said first rectifier and said first capacitor connected to said gate of said first rectifier, said second capacitor having a first terminal connected to the junction between said fourth resistor and said first capacitor with a second terminal of said second capacitor connected to said gate of said second rectifier, first, second and third Zener diodes each having an anode and cathode, each of said rectifiers having one of said Zeners connected between said gate and said cathode of said rectifier with said cathode of said Zener connected to said gate of said rectifier and said anode of said Zener connected to said cathode of said rectifier, and a bias potential, said fifth resistor being connected between said gate of said third rectifier and said bias potential, whereby reverse bias is applied to each of said rectifiers to prevent a change in voltage across said serially connected rectifiers from firing said first, second and third rectifiers.

10. A voltage sharing circuit for use with a positive voltage potential and a reference potential, said circuit comprising a first and a second silicon controlled rectifier, each having an anode, a cathode and a gate, said first and second rectifier being serially connected with said cathode of said first rectifier connected to said anode of said second rectifier and said cathode of said second rectifier connected to the reference potential, said anode of said first rectifier being coupled to said positive potential, a signal input terminal, said terminal being connected to said gate of said second rectifier, first, second and third resistors, a first and a second capacitor, said first resistor and first capacitor each being connected between said anode of said first rectifier and said cathode of said first rectifier, said second resistor and second capacitor each being connected between said gate of said first rectifier and said cathode of said second rectifier, a first and a second Zener diode each having an anode and a cathode, each of said rectifiers having one of said Zeners connected between said gate and said cathode with said cathode of said Zener connected to said gate of said rectifier and said anode of said Zener connected to said cathode of said rectifier, and a bias potential, said third resistor being connected between said gate of said second rectifier and said bias potential, whereby reverse bias is applied to each of said rectifiers to prevent a change in voltage across said serially connected rectifiers from firing said first and second rectifiers.

11. A voltage sharing circuit for use with a positive voltage potential and a reference potential, said circuit comprising a first and a second silicon controlled rectifier each having an anode, a cathode and a gate, said first and second rectifiers being serially connected with said cathode of said first rectifier connected to said anode of said second rectifier and said cathode of said second rectifier connected to the reference potential, said anode of said first rectifier being coupled to said positive potential, a signal input terminal, said terminal being connected to said gate of said second rectifier, a diode having an anode and a cathode, said anode of said diode being connected to said anode of said first rectifier, first, second and third resistors, a first and a second capacitor, said first resistor and said first capacitor each being connected between said cathode of said first diode and said cathode of said first rectifier, said second resistor and said second capacitor each being connected between said gate of said first rectifier and said cathode of said second rectifier, a first and a second Zener diode each having an anode and a cathode, each of said rectifiers having one of said Zeners connected between said gate and said cathode with said cathode of said Zener connected to said gate of said rectifier and said anode of said Zener connected to said cathode of said rectifier, a bias potential, said third resistor being connected between said gate of said second rectifier and said bias potential, whereby reverse bias is applied to each of said rectifiers to prevent a change in voltage across said serially connected rectifiers from firing said first and second rectifiers.

References Cited by the Examiner

UNITED STATES PATENTS

| 3,100,268 | 8/1963 | Foote | 307—88.5 |
| 3,139,586 | 6/1964 | Dolan | 307—88.5 |
| 3,158,799 | 11/1964 | Kelley et al. | 307—88.5 |

FOREIGN PATENTS

| 1,347,616 | 2/1963 | France. |
| 917,382 | 2/1963 | Great Britain. |

JOHN W. HUCKERT, *Primary Examiner.*

I. C. EDELL, *Assistant Examiner.*